United States Patent

Mollere

[15] 3,669,213

[45] June 13, 1972

[54] SEISMIC GAS EXPLODER APPARATUS

[72] Inventor: John C. Mollere, San Marino, Calif.

[73] Assignee: Western Geophysical Company of America

[22] Filed: Nov. 29, 1968

[21] Appl. No.: 780,082

[52] U.S. Cl. ....................................................181/0.5 NC
[51] Int. Cl. .........................................................G01v 1/38
[58] Field of Search ...............................181/0.5 IC; 116/27

[56] References Cited

UNITED STATES PATENTS

| | | |
|---|---|---|
| 1,221,337 | 4/1917 | Krill............................................60/32 |
| 2,047,928 | 7/1936 | Haring.......................................60/32 |
| 2,154,322 | 4/1939 | Cecil..........................................60/32 |
| 2,806,347 | 9/1957 | Pertile.......................................60/32 |
| 3,105,456 | 10/1963 | Gongwer..................................116/27 |
| 3,176,787 | 4/1965 | Roever....................................181/0.5 |
| 3,310,128 | 3/1967 | Chelminski............................181/0.5 |
| 3,480,101 | 11/1969 | Barry et al. ............................181/0.5 |

Primary Examiner—Rodney D. Bennett, Jr.
Assistant Examiner—Daniel C. Kaufman
Attorney—Alan C. Rose, Walter R. Thiel, Michael P. Breston and Alfred B. Levine

[57] ABSTRACT

A gas exploder seismic wave source which includes a closed chamber for receiving a mixture of combustible gases. Means are provided to detonate the combustible mixture thereby producing gaseous detonation products. Vacuum-operated exhaust means are coupled to the chamber to exhaust the detonation products from the chamber.

1 Claim, 3 Drawing Figures

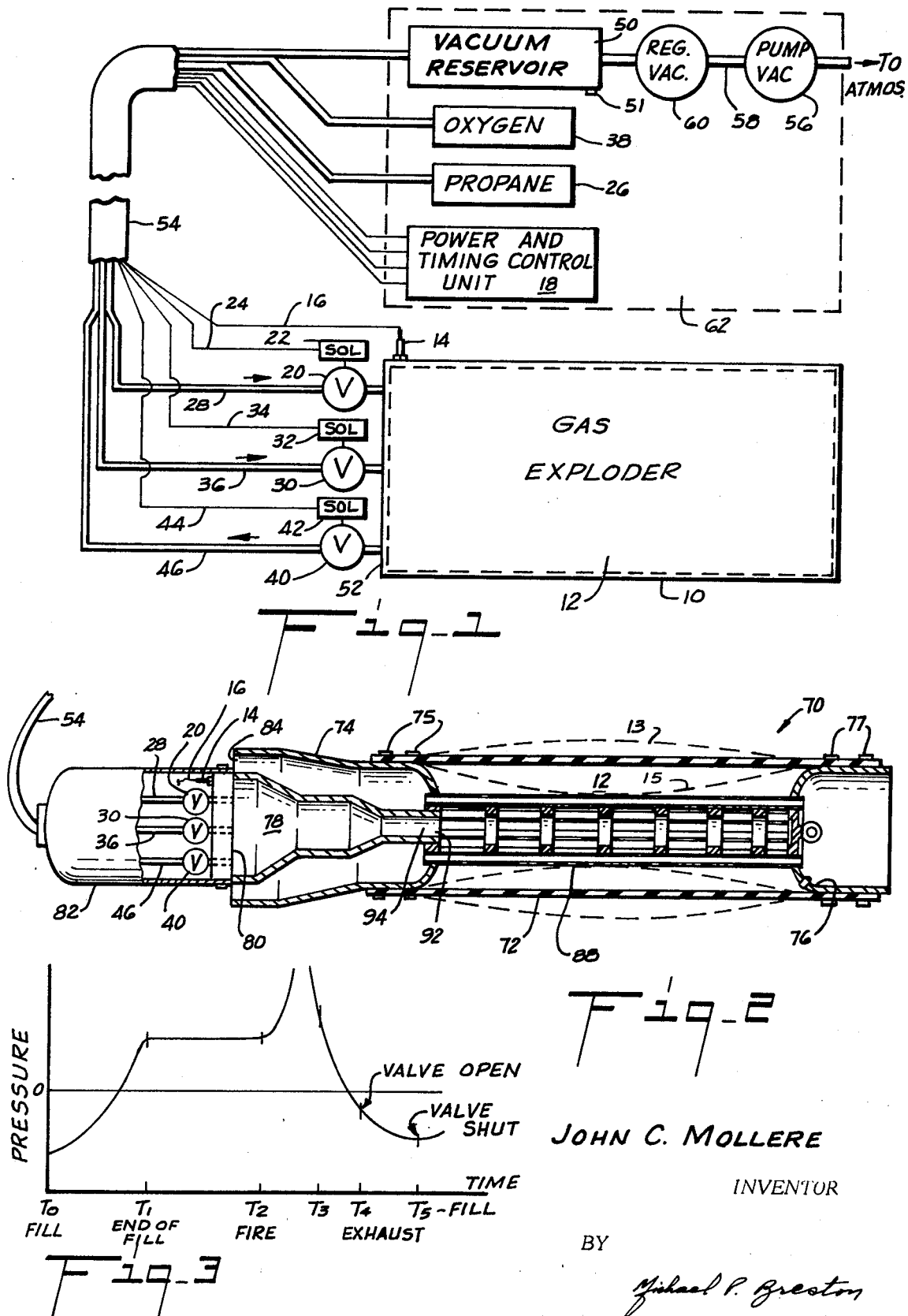

SEISMIC GAS EXPLODER APPARATUS

BACKGROUND OF THE INVENTION

In seismic exploration, the use of impulses for the study of the earth's substrata is well known and generally depends on the generation of suitable seismic disturbances at or near the earth's outer surface or in water by some suitable means. A portion of the seismic impulse or disturbance travels downwardly through the earth until it encounters a subsurface discontinuity, such as an interface between strata. The interface causes a reflection of at least a portion of the seismic energy back toward the outer surface of the earth. Suitable detection devices such as geophones and hydrophones, positioned in the vicinity of the generated seismic disturbances detect the reflected seismic wave energy. Since the time of initiation of the seismic impulses is known, by measuring the time intervals between the initiation of the seismic impulses and the reception of the reflected energies, at each of many detection stations, it is possible to establish a record from which a geologist may obtain helpful information concerning the nature and structure of the underlying earth's subsurfaces.

Several seismic impulse generators and methods are known. To name only a few: the so-called "shot hole" method wherein a shot hole is drilled into the ground and a suitable explosive charge is detonated within the shot hole to generate the desired seismic impulses; the so-called "weight drop method" wherein a large mass is periodically dropped; and the "explosion method."

According to the explosion method the seismic impulse is generated by the explosion of a suitable explosive charge, such as a mixture of propane and oxygen within an explosion chamber. It is desired, of course, from such gas exploders to obtain a relatively sharp rising output pulse as well as optimum efficiency. A limiting factor in obtaining optimum operating efficiency as well as pulse shape is attributed to the inherent limitations of mechanically operated exhaust valves. Such exhaust valves ordinarily have a preset spring tension. An untimely opening of an exhaust valve causes leakage of combustible gases, improper firing synchronization, bouncing, loss of output energy, etc.

Another difficulty encountered especially in marine seismic exploders is caused by the fact that the purging of the products of combustion in each combustion cycle is to a great extent dependent upon the water pressure at the depth of "shooting." In relatively deep waters, the sea water head is adequate. In shallow waters, however, the head is insufficient to cause a complete purging of the products of combustion. When a fresh charge of combustible gases is admitted into a volume containing residue non-combustible products, improper inter-gas mixing results, and the wave shapes of the output seismic signals rapidly deteriorates. Since the energy source is a most important factor in obtaining good seismic records, the significance of the above-described and other drawbacks will become readily apparent.

Yet another difficulty encountered with some prior art gas exploders is ascribed to the fact that during the condensation of the products of combustion there is such a rapid pressure collapse that in addition to the desired main output pulse secondary undesirable pulses become generated. With mechanically operated exhaust valves, it was rather difficult to obtain consistent and uniform output impulses from a plurality of gas exploders operated simultaneously. Another problem is encountered with marine gas exploders in that they depend upon the outside water pressure surrounding the exploder for compressing the combustion chamber to expel therefrom the products of combustion. This makes the operation of the exploder dependent upon the depth of shooting. In relatively deep waters the operation is satisfactory, whereas in relatively shallow waters the operation becomes unreliable, inefficient and sometimes even erratic.

Another serious limitation of some prior art marine gas exploders was due to the fact that, after the mechanically operated exhaust valve has been set to open at a particular pressure differential, no variations in the pre-firing pressure was possible without readjusting the spring tension in the exhaust valve. In the field such readjustments are very time consuming, expensive, and seriously slow down the progress of the seismic exploration crew.

SUMMARY OF THE INVENTION

Briefly, this invention relates to a gas exploder seismic wave source which includes a closed chamber having a movable wall. Means are provided to supply an explosive mixture to the chamber and to detonate the explosive mixture thereby producing gaseous detonation products. The improvement of this invention comprises vacuum-operated exhaust means which are coupled to the chamber to exhaust the detonation products from the chamber. The exhaust means include a controllable exhaust valve.

Accordingly, it is a principal object of the present invention to provide an improved seismic gas exploder apparatus.

A further object of the present invention is to provide an improved seismic wave generating device wherein increased compression of the combustible charge prior to ignition is readily obtainable.

Another object of the present invention is to provide an improved seismic wave generating device wherein the generation of undesirable secondary seismic impulses are eliminated.

Yet a further object of the present invention is to provide an improved gas exploder apparatus which readily lends itself for simultaneous operation with other such exploders.

Still another object of the present invention is to provide an improved gas exploder which substantially eliminates the described and other drawbacks of conventional seismic gas exploders and which operates efficiently throughout a relatively great range of variations in surrounding environmental conditions and in levels of underwater operations.

Another object of the present invention is to provide a gas exploder apparatus capable of selectively producing higher energy seismic impulses.

A very important object of this invention is to provide a gas exploder apparatus which is especially adapted for generating seismic impulses in very shallow waters.

Other objects of the entire scope of the present invention will become apparent from the following detailed description and by reference to the accompanying drawings. It should be understood, however, that the detailed description is given by way of illustration only, since various changes and modifications falling within the spirit and scope of the invention will readily become apparent to those skilled in the art.

Referring now to the drawings in which:

FIG. 1 is a block diagram representation of a seismic gas exploder system embodying the present invention;

FIG. 2 is a cross-sectional view of a preferred gas exploder apparatus which is especially adapted for use in connection with the system shown in FIG. 1; and FIG. 3 is a pressure-time diagram of the pressure in the combustion chamber in the apparatus shown in FIG. 2.

Referring now to FIG. 1 of the drawings, a seismic pulse generating apparatus is generally indicated by the reference character 10. The apparatus may be any suitable conventional seismic gas exploder such as the "AQUAPULSE" (a trademark of Western Geophysical Company of America), the "Dinoseis" (a trademark of Sinclair Corporation) and others. Conventional gas exploders are well described in the technical and patent literature. Any such gas exploder typically includes a variable volume combustion chamber 12 represented by dotted lines 12 inside exploder 10. A pressurized fuel or fuel mixture is introduced into combustion chamber 12 which is provided with one or more spark plugs 14 threadedly mounted in a wall of the firing chamber. The spark plug 14 is connected through a lead wire 16 to a suitable source of electrical energy forming part of a power and timing control unit 18.

An intake valve 20 is actuated by a solenoid 22 which is energized through a lead wire 24 by the power unit 18. Valve 20 controls the intake of fuel gases such as propane from a propane supply 26 feeding a line 28.

Another intake valve 30 is operated by a solenoid 32 which is energized through a lead wire 34 connected to the power and timing control unit 18. Valve 30 controls the intake of oxygen (or air) from a line 36 coupled to an oxygen source 38.

Chamber 12 is also provided with an exhaust valve 40 actuated by a solenoid 42 which is controlled by a lead wire 44 connected to the power and timing control unit 18. Valve 40 leads the exhaust gases through a line 46 into a vacuum chamber or reservoir 50. Valves 20, 30 and 40 are suitably mounted on an end wall 52 forming part of or connected to the gas exploder apparatus 10. The various gas lines 28, 36 and 46 as well as the electric wires 16, 34, and 44 are suitably grouped into a cylindrical resilient pipe or other housing 54 which extends them to the reservoir 50, gas sources 26 and 38 and power and timing control unit 18. The vacuum reservoir 50 is driven by a vacuum pump 56 connected to the reservoir 50 through a line 58 and a vacuum regulator 60. Elements 56, 60, 50, 38, 26, and 18 are all shown enclosed by a dotted line in a volume 62 typically located on a carrier vehicle or on board ship (not shown).

For a better understanding of this invention reference is made to FIG. 2 wherein an "AQUAPULSE" apparatus generally designated by reference character 70 is shown. Source 70 includes a resilient, stretchable sleeve or boot 72 fixedly clamped onto a front end seal 74 and a back end seal 76 by clamps 75, 77 respectively. A horn-shaped firing chamber 78 terminates in an end wall 80 to which are connected the inlet valves 20, 26, the exhaust valve 40 and the spark plug 14. Other elements may be connected to the end wall 80 for monitoring the conditions within the firing chamber 78. Also, the supply lines 28 and 36 may be combined into a single line for feeding a thoroughly mixed combustible mixture into the firing chamber 78. A cover housing 82 removably secured to end wall 80 encloses the spark plug and the inlet and exhaust valves as shown.

A passage 84 is formed between the inner wall of seal 74 and the outer wall of firing chamber 78 to allow water to enter into a plurality of water carrying cooling tubes 88 extending between end seals 74 and 76. The inner volume of sleeve 72 forms an expansion chamber 12. Access to the expansion chamber 12 from the firing chamber 78 is provided by a circular opening 92 in the mouth 94 of the firing chamber 78 which extends only a short distance past its joint with the front end seal 74.

As previously described, the exhaust valve 40 is connected through line 46 to the remotely positioned vacuum reservoir 50. Reservoir 50 is 50 which may be of any convenient shape. Reservoir 50 is made to have a wall thickness sufficient to withstand the external pressures acting thereon and to have an inner volume adequate to properly accommodate after each cycle of operation the exhaust products and gases of combustion from the expansion chamber 12 without raising significantly the internal pressure of reservoir 50. Line 46 can be of substantially reduced diameter say on the order of ½ to 1 inch diameter instead of 4 to 6 inches previously required in similar prior art apparatus.

In practice, several exploder sources 70 are operated simultaneously. Chamber 50 may receive the exhaust from one or several such exploders. In the preferred embodiment, however, each exploder is provided with at least one reservoir 50 so that if any one individual exhaust system becomes defective, it will be convenient to identify and rapidly isolate the defective exploder. A drain valve 51 is provided for draining any liquid which may be formed in or come into the reservoir 50. The vacuum pump 56 is of the fast-acting type. It may continuously operate to maintain a continuous vacuum in reservoir 50 through regulator 60. Both regulator 60 and pump 56 are of conventional design and are available commercially.

It will be appreciated that between the atmosphere and the exhaust valve 40 are now interposed elements 56, 60, and 50 which make the exhaust system a so-called "closed" system, in contradistinction to the so-called "open" system, wherein the exhaust pipe 46 must have a relatively large diameter to avoid back pressures, and is sufficiently long to discharge the products of combustion directly to the atmosphere. In the "open" exhaust system, water enters through the exhaust pipe 40 and corrodes the internal parts of the valve itself as well as the inside walls of the firing chamber 78 thereby causing misfiring, leakage of exploded gases, and damage to the exploder itself. The solenoid-operated valves 20 and 30 allow a pressurized supply of fuel to enter into the expansion chamber 12 and prevent any exhaust gases from entering the feed lines 28, 36 when the combustion chamber 12 is being purged. The solenoid-operated valve 40 is controlled and programmed in such a manner that the valve is closed when the combustion chamber is being charged and opened when the combustion chamber is being purged of the exhaust gases. The energization of the spark plug 14 and of the solenoids 22, 32 and 42 is controlled by the control unit 18 which includes means well known in the art, and no detailed description thereof is believed to be necessary. Thus, the times of ignition of the fuel within chamber 12 and the times of actuation of the solenoids are all coordinated so as to insure proper operation of the apparatus. It will be understood that the energy source 70 is a marine seismic gas exploder which is placed under water and towed by a cable (not shown) from a ship. The hydrostatic water head above source 70 helps to compress the fuel mixture when the pressurized gases enter the combustion chamber during the fueling phase and additionally helps to purge the exhaust gases from the explosion chamber 12 during the exhaust phase of the cycle.

In operation, the apparatus 70 is located under water and is trailed by a boat. At the start of the "shooting" cycle, solenoid exhaust valve 40 is closed, solenoid inlet valves 20 and 30 are open which permit pressurized propane and oxygen to enter the combustion chamber 12. After the combustion chamber has been charged with a predetermined charge, the valves 20, 30 connecting the intake lines 28, 36 are turned off. The spark plug 14 is then energized to ignite the fuel mixture within the combustion chamber 12. The resultant explosion causes the stretchable boot 72 to expand and assume an enlarged volume as represented by the dotted lines 13. The rapid expansion of boot 72 results in an acoustic wave creating the desired seismic impulse. The reflection of the seismic impulse from the different strata in the earth is detected by hydrophone receivers and properly recorded.

With particular reference to FIG. 3, just prior to the opening of the inlet valves 20 and 26, that is, just prior to $T_o$, the pressure inside the firing chamber 78 and expansion chamber 12 is at its lowest level and is below atmospheric pressure. At $T_o$ the exhaust valve 40 is closed and valves 20, 30 are opened to introduce a fresh charge of combustible gases and to allow the pressure inside the expansion chamber 40 to gradually increase until at a time $T_1$ it reaches its predetermined pre-firing pressure level which can be above or below atmospheric pressure. Since the time of opening of exhaust valve 40 can be remotely controlled, the pre-firing pressure level can be varied by varying the pressure in the gas sources 26 and 38.

At a time $T_2$ the ignition pulse is applied through wire 16 which ignites the combustible charge in firing chamber 78. The combustion spreads throughout the entire combustion chamber 12 very rapidly. From time $T_2$ to a time $T_3$ (on the order of a few milliseconds) there is a sharp pressure rise inside the expansion chamber 12 which rapidly collapses because of cooling water circulating through pipes 88. At a time $T_4$ the exhaust valve 40 is caused to open by energizing (or deenergizing) solenoid 42. A purging of the products of combustion through the exhaust valve 40 and line 46 rapidly takes place. The outside hydrostatic pressure head surrounding the apparatus 70 assists in the purging process. By using a remotely controlled valve 40, the valve can be selectively maintained open for variable periods of time, hence better purging of the products of combustion can be achieved. Greater efficiency of operation as well as greater uniformity in the generated seismic impulses are thereby obtained.

It will be appreciated that the fuel lines 28, 36 now supply fuel and oxidizer gases at the beginning of each cycle, into an evacuated combustion chamber 12 which results in even greater intermixing between the gases, that the vacuum-controlled exhaust system allows control over the amount of contaminated gases left in the chamber 12 at the end of each cycle, that the timing apparatus in control unit 18 allows control over the operation of the exhaust valve 40 with adjustable time intervals to obtain more uniform seismic impulses thereby improving the overall efficiency of the seismic system, and that by intentionally delaying the opening of exhaust valve 40, the entrapped exhaust gases in chamber 12 act as an air cushion to prevent a too rapid collapse of boot 72 and hence the generation of secondary undesirable impulses.

It was found, when using a conventional mechanically operated exhaust valve in connection with the marine seismic apparatus 70, such as is described in co-pending application Ser. No. 779,931 and assigned to the same assignee, that after ignition the rise in pressure in the expansion chamber 12 would unseat the valve control element somewhat prematurely thereby allowing the stretchable sleeve 72 to very rapidly collapse against the water carrying tubes 88. It is theorized that the almost sudden collapse of sleeve 72 creates an external vacuum in the water in the volume defined between the dotted lines 13 representing the position of sleeve 72 during maximum expansion and dotted lines 15 representing the minimum position of sleeve 72 during contraction. It is anticipated that a minor implosion may take place, i.e., outside water rushes into the void created by the very rapid collapse of sleeve 72 thereby generating an implosion impulse which results in an undesirable secondary seismic impulse, immediately after the desired primary seismic impulse previously described.

By suitably delaying the opening of the exhaust valve 40 the gas products of combustion are entrapped in the explosion chamber 12 and are used to serve as a cushion for resisting the sudden collapse of sleeve 72 and for preventing the generation of undesirable secondary seismic impulses.

While the preferred form of the invention has been shown and described, it is to be understood that all suitable modifications and equivalents may be resorted to which fall within the scope of the invention as claimed.

What is claimed is:

1. A gas exploder system for generating pulses of energy including:
   a housing adapted to be towed under water, said housing having inner walls defining at least a combustion chamber assembly including an elastic inflatable member covering at least a portion of the surface of said assembly,
   means to supply a combustible mixture to said housing,
   means to ignite said combustible mixture within said housing thereby producing gaseous products of combustion,
   vacuum-operated exhaust means operatively coupled to said housing and arranged to purge said gaseous products of combustion from said housing,
   said exhaust means including: a remotely controllable exhaust valve operatively coupled to said housing, a vacuum chamber, vacuum-creating means coupled to said vacuum chamber for maintaining a predetermined vacuum throughout said exhaust means, said vacuum-creating means comprising a vacuum pump, said vacuum chamber and said vacuum pump being positioned at a relatively remote location from said housing, and coupling means including a flexible hose for coupling said vacuum chamber to said housing; and
   said exhaust valve being remotely actuated at time intervals selected to allow said products of combustion to accumulate within said combustion chamber thereby avoiding the generation of undesirable secondary pulses of energy caused by the rapid deflation of said inflated member.

* * * * *